(12) United States Patent
Ganu

(10) Patent No.: US 10,382,564 B2
(45) Date of Patent: *Aug. 13, 2019

(54) METHOD AND SYSTEM FOR CLIENT ASSOCIATION MANAGEMENT BASED ON ESTIMATED SESSION DURATION

(71) Applicant: Aruba Networks, Inc., Sunnyvale, CA (US)

(72) Inventor: Sachin Ganu, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,735

(22) Filed: Mar. 20, 2018

(65) Prior Publication Data

US 2018/0213042 A1    Jul. 26, 2018

Related U.S. Application Data

(63) Continuation of application No. 14/519,895, filed on Oct. 21, 2014, now Pat. No. 9,936,028.

(51) Int. Cl.
*H04L 29/08* (2006.01)
*H04L 12/26* (2006.01)
*H04W 36/00* (2009.01)
*H04W 84/12* (2009.01)

(52) U.S. Cl.
CPC ....... *H04L 67/142* (2013.01); *H04W 36/0083* (2013.01); *H04W 36/00837* (2018.08); *H04L 43/08* (2013.01); *H04W 84/12* (2013.01)

(58) Field of Classification Search
None
See application file for complete search history.

(56) References Cited

U.S. PATENT DOCUMENTS

| | | |
|---|---|---|
| 5,594,943 A | 1/1997 | Balachandran |
| 7,206,579 B2 | 4/2007 | Gwen et al. |
| 8,346,258 B2 | 1/2013 | Kitaji |
| 9,326,209 B2 | 4/2016 | Huang et al. |
| 2006/0148479 A1 | 7/2006 | Park et al. |
| 2008/0280615 A1 | 11/2008 | Vinayakray-Jani |
| 2010/0246534 A1 | 9/2010 | Vargantwar |
| 2013/0170471 A1 | 7/2013 | Nix |
| 2015/0038140 A1 | 2/2015 | Kilpatrick, II et al. |
| 2015/0065137 A1 | 3/2015 | De Pasquale et al. |
| 2015/0382270 A1 | 12/2015 | Kordybach et al. |
| 2016/0029279 A1 | 1/2016 | Bellamkonda et al. |
| 2016/0050589 A1 | 2/2016 | Safavi |

*Primary Examiner* — Shirley X Zhang

(74) *Attorney, Agent, or Firm* — Hewlett Packard Enterprise Patent Department

(57) ABSTRACT

The present disclosure discloses a method and a network device for client association management based on estimated session duration. Specifically, a network device determines that a client device is on an active session. The client device is associated with a first access point of a plurality of access points. The network then estimates a remaining duration of the active session to obtain an estimated remaining duration. Responsive at least to the estimated remaining duration of the active session being greater than a threshold value, the network device causes the client device to associate with a second access point different than the first access point. Responsive at least to the estimated remaining duration of the active session being less than the threshold value, the network device refrains from causing the client device to associate with the second access point.

20 Claims, 7 Drawing Sheets

US 10,382,564 B2

METHOD AND SYSTEM FOR CLIENT ASSOCIATION MANAGEMENT BASED ON ESTIMATED SESSION DURATION

FIELD

This application is a Continuation of U.S. application Ser. No. 14/519,895 filed on Oct. 2, 2014, the content of which are incorporated herein by reference in its entirety. The Applicant hereby rescinds any disclaimer of claim scope in the parent application or the prosecution history thereof and advices the USPTO that the claims in this application may be broader than any claim in the parent application.

Embodiments of the present disclosure relate to client management by network devices. In particular, embodiments of the present disclosure describe a method and system for client association management based on estimated session duration.

BACKGROUND

Conventionally, ClientMatch™ technology allows a network device to move a client device associated with one radio of one access point (AP) to another radio of the same or a different AP. When a client device on a network is in the midst of a delay-sensitive or disruption-sensitive transaction, a network infrastructure needs to determine whether the client device should be steered to another radio and/or access point due to poor performance of the current radio of the access point to which the client device is associated with.

If the network infrastructure decides not to move a client device while it is on an active call, the client device may suffer poor call quality if the call is associated with an extended duration. On the other hand, if the network infrastructure decides to move the client device to be associated with a better radio during its active call, the call quality will degrade momentarily during the transition. If the call does not last too long, then the cost of moving the client device cannot be justified by the slight improvement in the call quality. Therefore, conventionally, a network infrastructure lacks ability to make intelligent decisions in these situations.

DETAILED DESCRIPTION

In the following description, several specific details are presented to provide a thorough understanding. While the context of the disclosure is directed to client management by network devices, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

OVERVIEW

Embodiments of the present disclosure relate to client management by network devices. In particular, embodiments of the present disclosure describe a method and network device for client association management based on estimated session duration.

With the solution provided herein, a network device determines that a client device is on an active session, whereas the client device is associated with a first access point of a plurality of access points. The network then estimates a remaining duration of the active session to obtain an estimated remaining duration. Responsive at least to the estimated remaining duration of the active session being greater than a threshold value, the network device causes the client device to associate with a second access point different than the first access point. Responsive at least to the estimated remaining duration of the active session being less than the threshold value, the network device refrains from causing the client device to associate with the second access point.

Moreover, according to some embodiments, the network device determines that a client device is on an active session. The client device is associated with a first access point of a plurality of access points. The network device also estimates a remaining duration of the active session to obtain an estimated remaining duration. Furthermore, the network device determines a ratio between (a) the remaining duration of the active session and (b) a cost of causing the client device to associate with a second access point different than the first access point. Based on the ratio, the network device either causes or refrains from causing the client device to associate with the second access point.

Network Computing Environment

Figure 1:
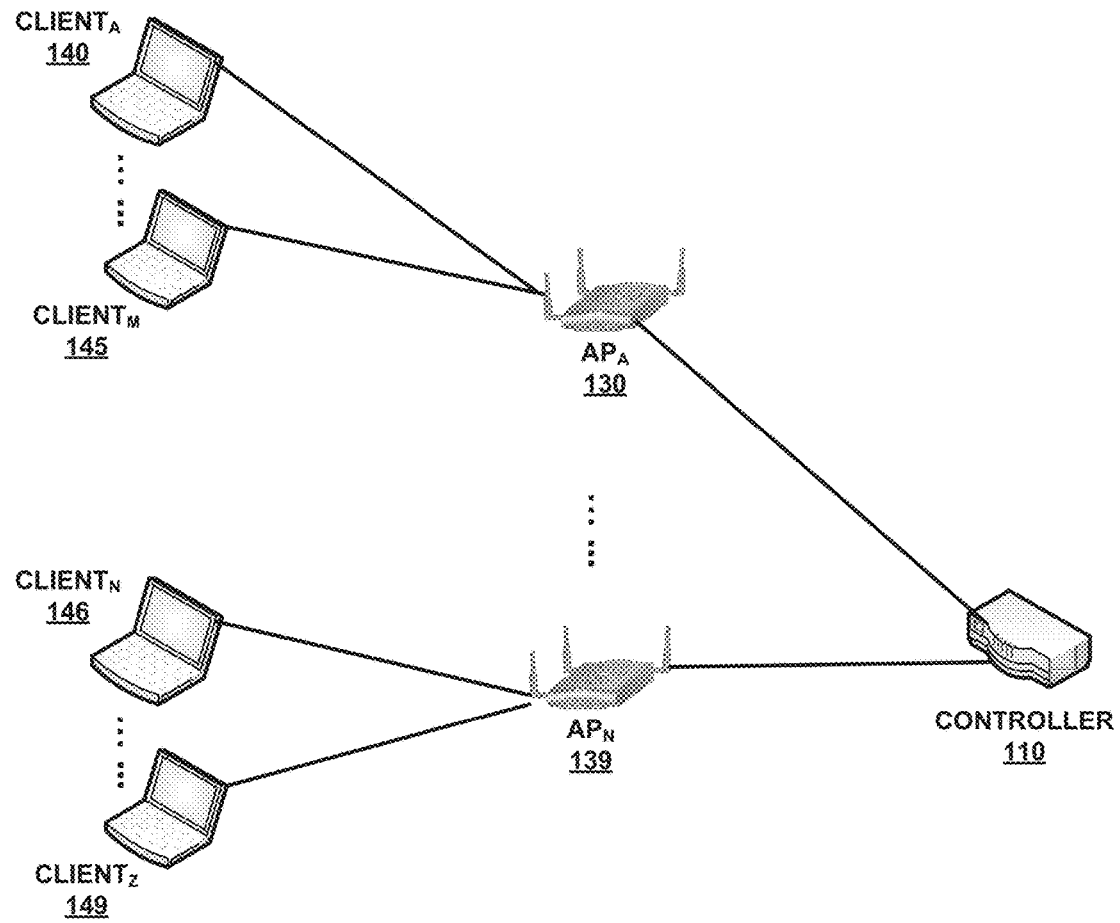
FIG. 1 shows an exemplary network environment according to embodiments of the present disclosure.

FIG. 1 shows an exemplary network environment according to embodiments of the present disclosure. Specifically, FIG. 1 illustrates a network that includes at least a network controller 110, a number of access points (APs) (such as, $AP_A$ 130 to $AP_N$ 139), and a plurality of client devices, such as $Client_A$ 140, ..., $Client_M$ 145, $Client_N$ 146, ..., $Client_Z$ 149, etc.

Network controller 110 generally refers to a controlling device that manages other network devices such as wireless access points. Network controller 110 may handle automatic adjustments to radio frequency power, wireless channels, wireless authentication, and/or security, and deliver essential mobility services such as AppRF technology for OSI Layer 4-7 application control, multicast Domain Name System (DNS) optimization, IP roaming, and Security Assertion Markup Language (SAML) integration based on user roles, devices, applications and location. Furthermore, network controller 110 can be combined to form a wireless mobility group to allow inter-controller roaming. In some embodiments, network controller 110 can centralize IP services and policy control across wired and wireless as well as simplify the integration of network security and third-party enterprise application platforms.

Access points, e.g., $AP_A$ 130 to $AP_N$ 139, generally refer to a set of wireless network devices that allow wireless client devices to connect to a wired network using IEEE 802.11 or related standards. The APs usually connect to a router via a wired network, but can also be an integral component of the router itself.

Each access point serves one or more client devices. For illustration purposes only, assuming that, in FIG. 1, a first set of client devices, such as $Client_A$ 140, ..., $Client_M$ 145, associate with $AP_A$ 130. Moreover, assuming that a second set of client devices, such as $Client_N$ 146, ..., $Client_Z$ 149, associate with $AP_N$ 139.

Moreover, a client device (e.g., $Client_A$ 140) may be involved in an active voice call, a video call, and/or other delay-sensitive or disruption-sensitive application sessions. Furthermore, the client device are often a mobile device that could move from one physical location to another physical location during an active delay-sensitive or disruption-sensitive session. As the client device moves within the coverage area of a wireless local area network (WLAN), the signal strength of signals received by a radio of an access point (AP) could fluctuate and hence impair the quality of an ongoing application session. Typically, when a client device detects that a received signal strength level associated with a signal from an access point is below a threshold, the client device may disassociate with the current radio and associate with another radio associated with better received signal strength indicators. For some client devices, however, a roaming event may not occur if the respective client device is on an active call. For such client device, the network infrastructure will need to determine whether it is beneficial for the network infrastructure to steer the client device away from the currently associated radio of the AP and guide the client device to associate with a new radio and/or a new AP.

Actions Upon Detection of Ongoing Disruption-Sensitive Application Sessions

The network infrastructure (which includes a plurality of network controllers, switches, routers, access points, servers, etc.) has a certain degree of visibility of all packets transmitted on the network, and thus can detect when a particular client device is involved in an ongoing delay-sensitive and/or disruption-sensitive application session, such as a real-time video session, a voice session, a unified communication session, etc. In particular, a network device can inspect Real-time Transport Protocol (RTP) and RTP Control Protocol (RTCP) traffic. RTP generally defines a standardized packet format for delivering audio and video over IP networks. RTP is used extensively in communication and entertainment systems that involve streaming media, such as telephony, video teleconference applications, television services and web-based push-to-talk features. While RTP carries the media streams (e.g., audio and video), RTCP is used to monitor transmission statistics and quality of service (QoS) and aids synchronization of multiple streams. Furthermore, the network device can use heuristic analysis and port mapping to detect any Session Initiation Protocol (SIP)-based application sessions. SIP generally assists in setting up connections across the network.

Some application sessions, e.g., VoWiFi call sessions, audio and/or video media streams, or other real-time sessions, are sensitive to delays, jitters, packet losses, etc. When such adverse network conditions occur during such an active application sessions, two primary actions can be taken.

A. Not Move Client Device

The first action that the network infrastructure can take is to allow the client device stay associated with the same radio of the same AP, and therefore, minimizing the disruption of the ongoing session from roaming events. Note that, the network infrastructure may determines to allow the client device to be associated with the same radio even though a better radio exists in the network that can provide better signals to the client device.

B. Move Client Device to Associate With a Better Radio

The second action that the network infrastructure can take is to move the client device in an ongoing session to another radio with a better signal quality. The network infrastructure can do so by de-authenticate the client device, and instruct only a selected subset of radios to respond to the probe requests and/or association requests received from the client device. Other radios and/or APs will refrain from responding to the probe requests and/or association requests received from the client device after it is disassociated with the original radio and/or AR Consideration Factors For Selecting Actions In order to choose between the above two primary actions, the network infrastructure needs to take a few factors into consideration, for example, the duration of the application session, the current call quality as well as the quality difference between the current radio and the new radio, cost of disruption from transitioning a client device from the current radio to the new radio, etc.

A. Estimation of Session Duration

There are a few ways to estimate the duration of a session. First, a network device can analyze historical data to estimate the duration of a session. For example, the network device can analyze user data for a particular user during a past period of time and observe any patterns of the sessions associated with the particular user. Patterns of the sessions may include the type of the session, the length of the session, the start and/or ending time of the session, etc.

Second, a network device can estimate the duration of a session based on inputs from other integrated applications. Some applications (e.g., Lync®) may be integrated to a particular user's calendar. For example, when the particular user schedules an online meeting via Lync®, the particular user may send to other meeting attendees an Outlook® meeting invitation attaching Lync® meeting information. The meeting invitation as well as the status (e.g., accepted, tentative, or declined) of each meeting attendee are stored on a network server.

Thus, upon detecting that (1) a particular client device is associated with an ongoing delay-sensitive and/or disruption-sensitive application session, and (2) the particular client device has been experiencing poor quality during the application session, the network infrastructure can check the network server storing user calendar information and retrieve the calendar information of a particular user associated with the client device. Based on the calendar information, the network infrastructure can estimate the duration of the application session. For example, if a particular user is scheduled to have an online meeting session between 1 pm and 3 pm and the particular user's client device is experiencing increased packet losses at 1:15 pm, then the network infrastructure can estimate that the online meeting session will last for approximately another 105 minutes.

Third, a network device can use Deep Packet Inspection (DPI) to determine whether a particular flow and/or session match the traffic profile of a known event. In this case, an initial SIP or Lync® transaction that has the metadata on the caller and callee address. Note that, these approaches are pattern-driven and complementary to Poisson-based and/or Erlang-based models that are statistic models often employed in telephony for predicting arrival rates and/or durations of events. In some embodiments, the network device can combine both the Poisson-based model and the Erlang-based model with pattern analysis to provide accurate estimation of session durations.

B. Quality of Radios

Once the estimate call duration is known, the network infrastructure can further determine a quality associated with a radio. For example, a network device can compute a mean opinion score (MOS) score of a session while maintaining current association to the AP extrapolated to match the estimated duration of the session. MOS generally refers to a test that is used in telephony networks for obtaining the user's view of the quality of the network. Measuring Voice over IP (VoIP) is a calculation based on performance of the IP network over which it is carried. The MOS score ranges from 1 to 5. Specifically, a MOS score of 1 indicates a bad quality where the level of impairment is very annoying; a MOS score of 2 indicates a poor quality where the level of impairment is annoying; a MOS score of 3 indicates a fair quality where the level of impairment is slightly annoying; a MOS score of 4 indicates a good quality where the level of impairment is perceptible but not annoying; and, a MOS score of 5 indicates an excellent quality where the level of impairment is very imperceptible. The calculation is defined in the ITU-T PESO P.862 standard which is incorporated herein by reference. If a client device is involved in an ongoing video session and/or a unified communication session, the network device can estimate the quality of the session based on, for example, throughput, latency, jitter, etc.

Figure 2:
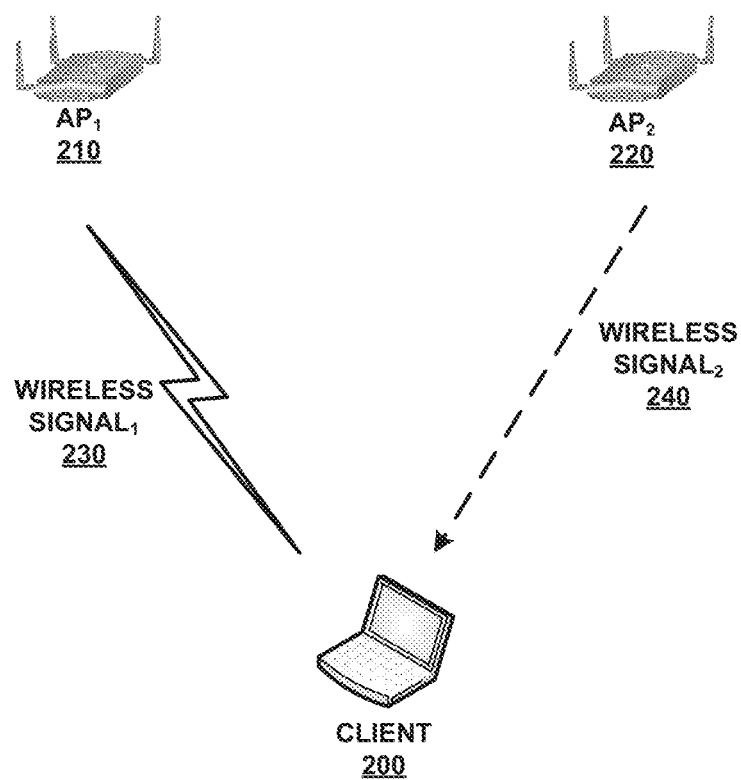
FIG. 2 shows an exemplary diagram illustrating exemplary link quality and radio performance assessment according to embodiments of the present disclosure.

FIG. 2 shows an exemplary diagram illustrating exemplary link quality and radio performance assessment. Specifically, FIG. 2 includes at least a client device 200, an access point $AP_1$ 210, and another access point $AP_2$ 220. Moreover, client device 200 is currently associated with $AP_1$ 210 via a wireless link and is involved in an ongoing delay- or disruption-sensitive application session, such as a voice call session. However, client device 200 is capable of receiving beacons transmitted from $AP_2$ 220 in the network. As illustrated in FIG. 2, wireless signal$_1$ 230 that $AP_1$ 210 receives from client device 200 has a received signal strength indicator value of 10 dB. On the other hand, wireless signal$_2$ 240 that $AP_2$ 220 receives from client device 200 has a received signal strength indicator value of 30 dB.

The network device can calculate a first session quality measure based on, e.g., MOS score, throughput, latency, jitter, etc., if client device 200 continues to be associated with $AP_1$ 210 during the rest of the session. In addition, the network device can also calculate a second session quality measure based on the improvement in quality of the ongoing session if client device 200 associates with a better radio (e.g., $AP_2$ 200), and as a result, suffering from a slight disruption caused by the steering event.

The quality of a current radio and/or AP (e.g., $AP_1$ 210) can be estimated based on a number of factors, including but not limited to, an interference level; a total number of client devices associated with the current radio and/or AP; a noise floor; a data rate supported for client devices; a signal-to-noise ratio (SNR) associated with a signal received from a client device indicating how well the current AP can hear the client device; etc.

The quality of a new radio (e.g., $AP_2$ 220) in the neighborhood of the current AP can be estimated based on how strong is a signal that the new radio (e.g., $AP_2$ 200) receives from client device 200. Even though client device 200 is not currently associated with AP2 200, client device 200 will periodically scans its radio frequency environment by transmitting, e.g., probe request messages. When $AP_2$ 200 receives such a message, $AP_2$ 200 can determine the signal strength associated with the received signal from client device 200, and a total number of client devices associated with $AP_2$ 200. If a large number of client devices already are associated with $AP_2$ 200, those client devices may compete with client device 200 for resources at the radio, which may lead to increased medium access delay for the new radio (e.g., $AP_2$ 200). In addition, the network infrastructure can also extrapolate a data rate at which a potential wireless link between client device 200 and $AP_2$ 220 can support. The data rate indicates how fast the speed of transmission is.

A medium access delay indicates how much a channel is utilized. When multiple links use the same wireless channel as in a shared medium scenario, each device must sense that the shared medium is free before the device can proceed with transmitting packets using the shared medium. The medium access delay is typically proportional to the total number of client devices served by the radios within the same RF neighborhood. This is because the more client devices exist in the RF neighborhood using the same shared medium, the higher likelihood that another device will be transmitting packets at the same time when a particular device decides to start transmitting network packets.

In the example illustrated in FIG. 2, if the signal received from client device 200 by $AP_2$ 220 has an SNR of 30 dB, in an ideal situation where there is no interference and no other client devices in the RF neighborhood, a link between client device 200 and $AP_2$ 220 would be capable of transmitting, for example, up to 65 Mbps data traffic. However, in real world scenarios, the transmission rate can drop below 65 Mbps due to, for example, non-WiFi interferences that increases to the packet losses in the vicinity of $AP_2$ 220. As another example, if there are 20 client devices in the RF neighborhood of $AP_2$ 220 competing for access to the shared medium. By contrast, assuming that only 2 client devices exist in the RF neighborhood of $AP_1$ 210. It may be more beneficial to allow client device 200 to stay connected with $AP_1$ 210, even though $AP_2$ 220 detected a higher SNR associated with the signals received from client device 200 than $AP_1$ 210.

Note that, $AP_1$ 210 and $AP_2$ 220 may be located within the same physical vicinity but operating on different channels, and thus belong to different RF neighborhoods. Thus, it is possible that although both $AP_1$ 210 and $AP_2$ 220 are located near each other, there are only a few client devices exist within $AP_1$ 210's RF neighborhood but a large number of client devices exist within $AP_2$ 220's RF neighborhood.

The packet loss rate is typically associated with the SNR of the link between the client device and the AP. Within the same RF neighborhood, the packet loss rate and jitter on a potential wireless link between client device 200 and a new radio (e.g., $AP_2$ 220) can be regarded as similar to those on a current wireless link between client device 200 and the current radio (e.g., $AP_1$ 210).

The link characteristic for the new radio can be estimated using the following formula:

(medium access delay+number of bytes/data rate)
*retry#

Then, the network device can estimate the time it would take for a new radio (e.g., $AP_2$ 220) to transmit one packet. On the other hand, the network device has the knowledge of the time it has taken the current radio (e.g., $AP_1$ 210) to transmit one packet. By comparing the estimated time for transmission on the new radio and the known time for transmission on the current radio, the network device can make a decision on whether client device 200 shall be moved from $AP_1$ 210 to $AP_2$ 220.

C. Cost of Disruption

Disruption of service can be caused by the time it takes to de-authenticate a client device, and for the client device to scan for other available radios and associate with a new radio. A subset of client devices, however, may support a BSS transaction.

Figure 3A:
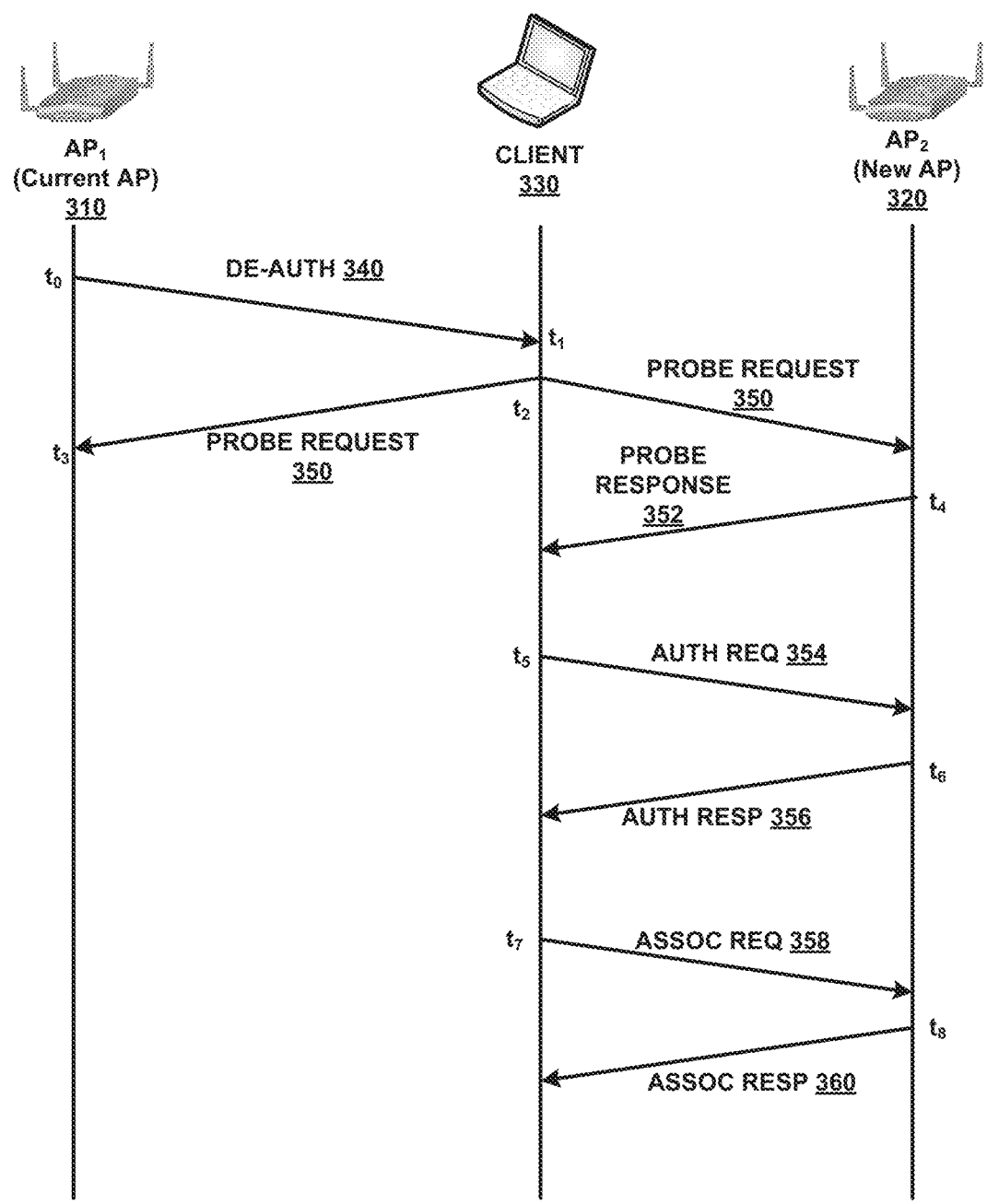
FIGS. 3A-3B show sequence diagrams illustrating various cost of interruption from transitioning client across different radios according to embodiments of the present disclosure.
Figure 3B:
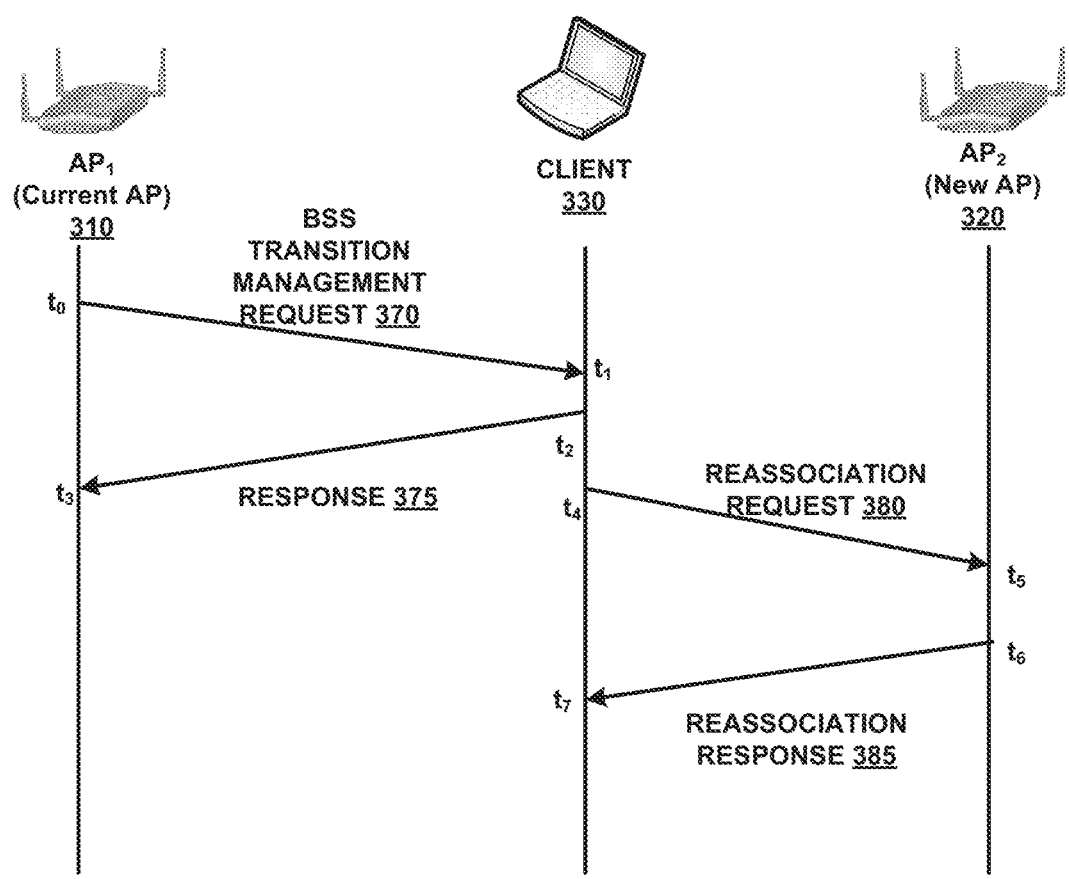

FIGS. 3A-3B show sequence diagrams illustrating various cost of interruption from transitioning client across different radios. Specifically, FIG. 3A illustrates a scenario in which the cost of disruption is high. FIG. 3A includes at least a current AP $AP_1$ 310, a new AP $AP_2$ 320, and client device 330. Assuming that, client device 330 is currently associated with $AP_1$ 310, but $AP_2$ 320 is also in the same physical vicinity that client device 330 could potentially be associated with. At time point $t_0$, $AP_1$ 310 transmits a de-authentication message 340 to client device 330. Client device 330 may be in a power save mode. If so, client device 330 wakes up from the power save mode and detects that client device 330 is disconnected with the network. Then, at time point $t_2$, client device 330 transmits a probe request message 350. Probe request message 350 can be a broadcast or multicast message. In this case, $AP_1$ 310 and $AP_2$ 320 receive probe request message 350 around time point $t_4$. Subsequently, $AP_2$ 320 transmits a probe response message 352 to client device 330 at time point $t_4$. At time point $t_5$, client device 330 transmits an authentication request message 354 to $AP_2$ 320, to which $AP_2$ 320 replies with an authentication response 356 at time point $t_6$. Thereafter, at time point $t_7$, client device 330 transmits an association request message 358 to $AP_2$ 320, to which $AP_2$ 320 replies with an association response 360 at time point $t_8$. Thus, client device 330 must complete a full communication handshake in accordance with IEEE 802.1X after being de-authenticated by $AP_1$ 310. As such, the cost of interruption in this example is quite high.

Moreover, FIG. 3B illustrates a scenario in which the cost of disruption is low. FIG. 3B includes at least a current AP $AP_1$ 310, a new AP $AP_2$ 320, and client device 330. Assuming that, client device 330 is currently associated with $AP_1$ 310, but $AP_2$ 320 is also in the same physical vicinity that client device 330 could potentially be associated with. Moreover, assuming that both client device 330 and APs (e.g., $AP_1$ 310 and $AP_2$ 320) support IEEE 802.11v fast roaming protocol.

At time point $t_0$, AP 310 transmits a basic service set (BSS) transmission management request message 370 to client device 330. Client device 330 receives BSS transmission management request message 370 at time point $t_2$, and subsequently, at time point $t_3$, client device 330 transmits a response message 375 to $AP_1$ 310. $AP_1$ 310 receives response message 375 at time point $t_3$. Thereafter, at time point $t_4$, client device 330 transmits a re-association request message 380 to $AP_2$ 320, which is received by $AP_2$ 320 at time point $t_5$. Next, $AP_2$ 320 replies with a re-association response message 385 at time point $t_6$, which is received by client device 330 at time point $t_7$. The transition from $AP_1$ 310 to $AP_2$ 320 is thus completed. As such, the cost of interruption in this example is rather low in the cases where both the client device and the APs support one or more fast transition protocols, such as the protocol specified by IEEE 802.11v standards.

Balancing Consideration Factors

In general, if (1) the estimated duration of an ongoing delay-sensitive or disruption-sensitive application session is relatively long, (2) the quality improvement from a client device associating with a new radio and disassociates with the current radio is relatively high, and (3) the cost of disruption from transitioning the client device from the current radio to the new radio is relatively low, then a network device will likely determine to steer the client device from being associated with the current radio to associate with the new radio while the client device is in an active ongoing application session (e.g., a voice call, a video call, a unified communication session, etc.).

Other Extended Uses

The same technique described above can be applied in general to other traffic flows as well. The flows may be characterized using DPI as—(1) long term flows, such as, video streaming, large FTP file transfers, etc., and (2) short term flows, such as, browsing etc. Additionally, the flows or application sessions can also be classified based on their quality-of-service (QoS) requirements as disruption-tolerant or disruption-intolerant. Based on knowledge of the expected flow durations and QoS requirements, appropriate steering decisions can be made.

For a long term flow, the network device can estimate the duration of a session based on the file size. Specifically, the network device can monitor the transfer rate and detect whether and when the transfer deteriorates as indicated by a persistent drop in the transfer rate. Then, the network device can estimate the duration of a session based on the size of a first portion that has been transferred in the current session and/or the size of a second portion that has not been transferred in the current session. Note that, similar to a call session, an FTP session can be sensitive to packet losses and/or jitter.

Moreover, although only two radios (or APs) are described herein for ease of illustration, multiple radios and/or multiple APs in the same RF neighborhood can be compared to determine whether and which radio a particular client device suffering a quality degradation during an ongoing sensitive session shall be steered to. When multiple potential new radios and/or APs exist, the estimation of the session duration remains the same for all radios and/or APs. However, the difference in the quality improvement and the cost of interruption from transitioning from the current radio to each of the new radio would be different.

Process for Client Association Management Based on Estimated Session Duration

Figure 4:
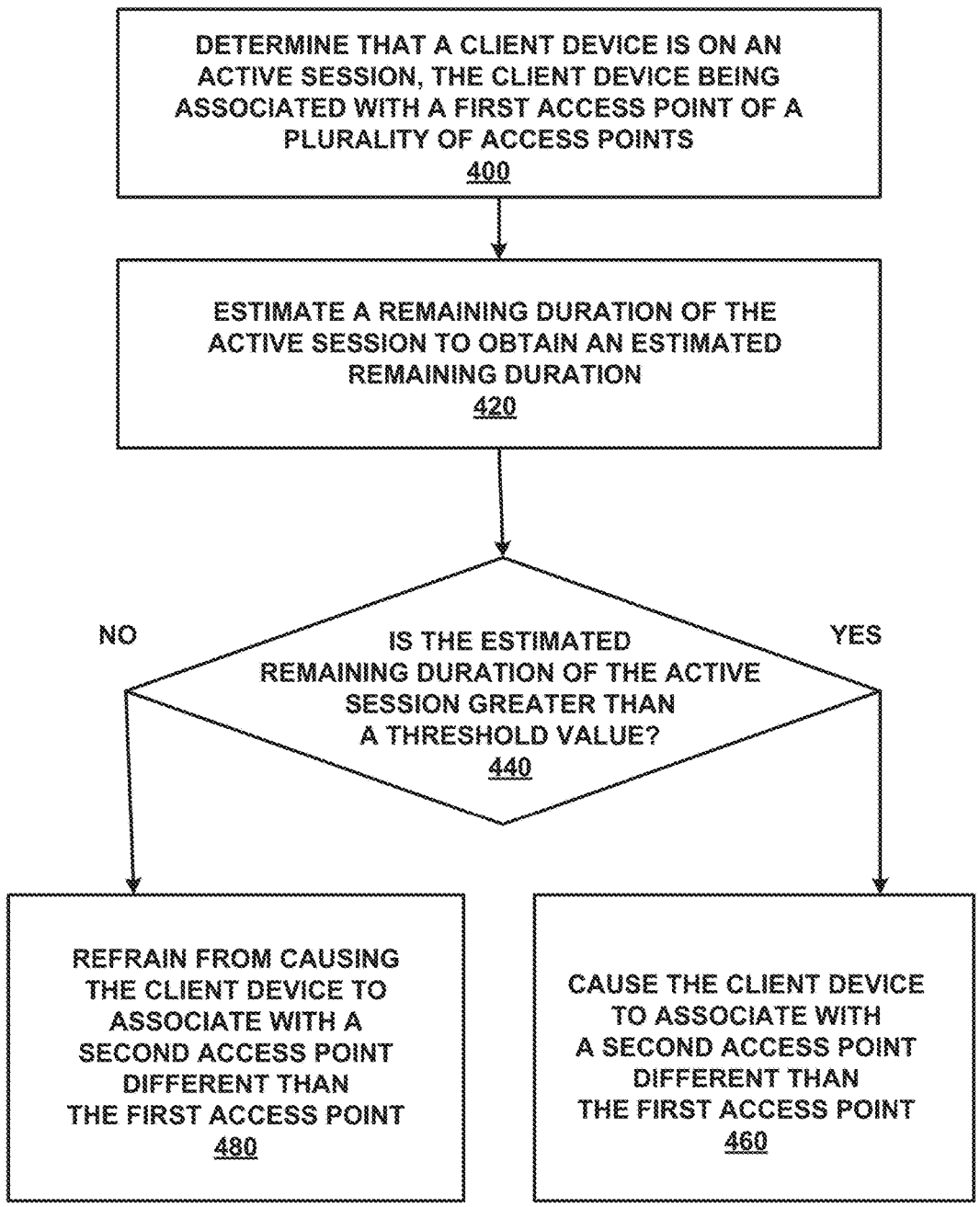
FIG. 4 illustrates an exemplary process for client association management based on estimated session duration according to embodiments of the present disclosure.

FIG. 4 illustrates an exemplary process for client association management based on estimated session duration according to embodiments of the present disclosure. During operations, a network device determines that a client device is on an active session, the client device being associated with a first access point of a plurality of access points (operation 400). The network device then estimates a remaining duration of the active session to obtain an estimated remaining duration (operation 420). Next the network device determines whether the estimated remaining duration of the active session is greater than a threshold value (operation 440). Responsive at least to the estimated remaining duration of the active session being greater than a threshold value, the network device causes the client device to associate with a second access point different than the first access point (operation 460). Responsive at least to the estimated remaining duration of the active session being less than the threshold value, the network device refrains from causing the client device to associate with the second access point.

In some embodiments, the threshold value is dynamically determined based on one or more active sessions associated with the client device. In some embodiments, the threshold value is dynamically determined based on one or more characteristics of the client device. In some embodiments, the threshold value is determined based on a port associated with the active session.

In some embodiments, the remaining duration of the active session is estimated based on historical data associated with the client device and/or a pattern associated with the client device. In some embodiments, the remaining duration of the active session is estimated based on information provided by one or more applications other than the application corresponding to the active session. In some embodiments, the remaining duration of the active session is estimated based on a time of day. In some embodiments, the remaining duration of the active session is estimated based on a calendar appointment. In some embodiments, the remaining duration of the active session is based on a file size associated with the active session and/or a transfer rate associated with the active session.

In some embodiments, the network device causes or refrains from causing the client device to associate with a second access point further based on a time estimated for the client device to associate with the second access point. In some embodiments, the network device causes or refrains from causing the client device to associate with a second access point further based on (a) a first Mean Opinion Score (MOS) between the client device and the first access point and (b) a second MOS expected between the client device and the second access point. In some embodiments, the network device causes or refrains from causing the client device to associate with a second access point further based on an expected throughput of the client device if the client device associated with the second access point. In some embodiments, the network device causes or refrains from causing the client device to associate with a second access point further based on a latency sensitivity associated with one or more active sessions for the client device. In some embodiments, the network device causes or refrains from causing the client device to associate with a second access point further based on a disruption toleration value associated with one or more active sessions for the client device. In some embodiments, the network device causes or refrains from causing the client device to associate with a second access point further based on (a) a first Signal to Interference and Noise Ratio (SINR) for wireless signals between the client device and the first access point and (b) a second SINR for wireless signals between the client device and the second access point. In some embodiments, the network device causes or refrains from causing the client device to associate with a second access point further based on a port associated with the active session.

In some embodiments, the network device further refrains from causing the client device to associate with the second access point. Note that, here, a signal strength quality between the client device and the second access point is better than a signal strength quality between the client device and the first access point. In some embodiments, the network device also causes the client device to disassociate with the first access point. In particular, the network device may instruct a first access point to blacklist the client device, whereas the network device will instruct the second AP to accept association requests from the client device, for example, when the client device supports BSS fast transition.

Figure 5:
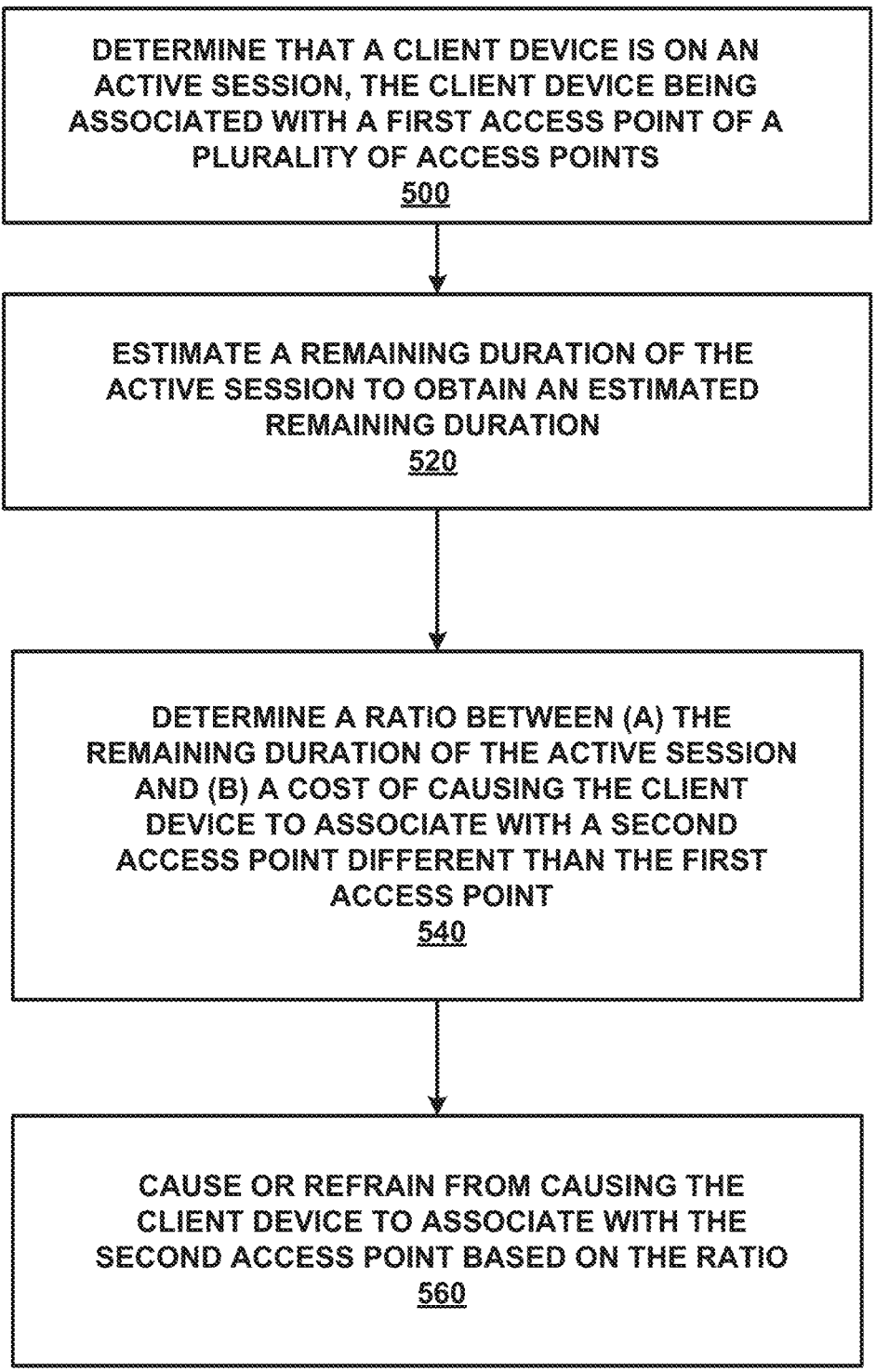
FIG. 5 illustrates an exemplary process for client association management based on estimated session duration according to embodiments of the present disclosure.

FIG. 5 illustrates another exemplary process for client association management based on estimated session duration according to embodiments of the present disclosure. The network device determines that a client device is on an active session, whereas the client device is associated with a first access point of a plurality of access points (operation 500). The network device then estimates a remaining duration of the active session to obtain an estimated remaining duration (operation 520). Moreover, the network device determines a ratio between (a) the remaining duration of the active session and (b) a cost of causing the client device to associate with a second access point different than the first access point (operation 540). Based on the ratio, the network device causes or refrains from causing the client device to associate with the second access point (operation 560). In some embodiments, the cost of causing the client device to associate with the second access point is based at least on an estimated disruption in service for the client device.

System for Client Association Management Based on Estimated Session Duration

Figure 6:
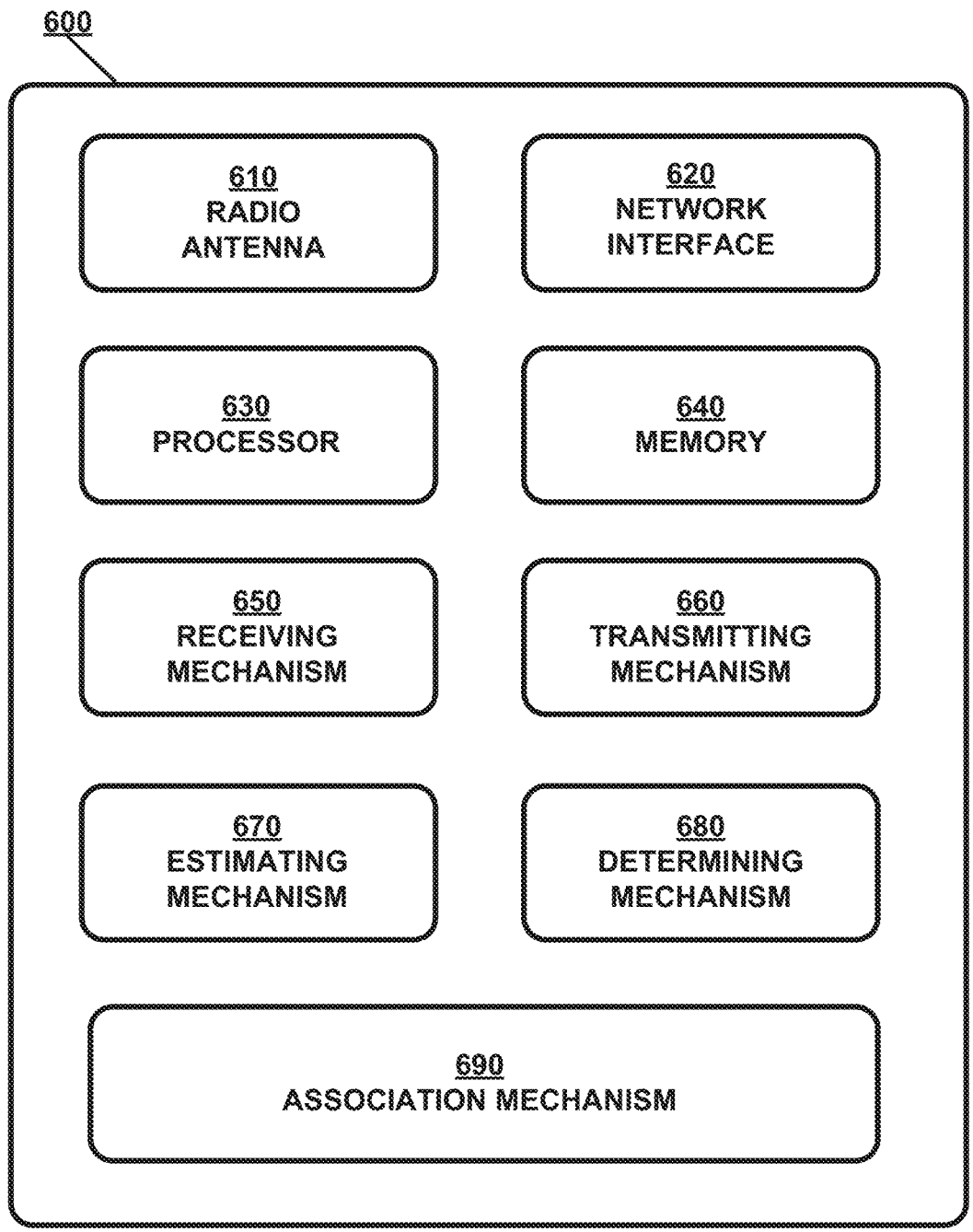
FIG. 6 is a block diagram illustrating an exemplary system for client association management based on estimated session duration according to embodiments of the present disclosure.

FIG. 6 is a block diagram illustrating an exemplary system for client association management based on estimated session duration according to embodiments of the present disclosure. Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes a receiving mechanism 650, a transmitting mechanism 660, an estimating mechanism 670, a determining mechanism 680, and an association mechanism 690, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc.

Receiving mechanism 650 generally receives one or more network messages via network interface 620 or radio antenna 610 from a wireless client. The received network messages may include, but are not limited to, requests and/or responses, beacon frames, management frames, control path frames, and so on.

Transmitting mechanism 660 generally transmits messages, which include, but are not limited to, requests and/or responses, beacon frames, management frames, control path frames, and so on.

Estimating mechanism 670 generally estimates a remaining duration of the active session to obtain an estimated remaining duration. The remaining duration of the active session can estimated based on one or more of: (1) historical data associated with the client device and/or a pattern associated with the client device, (2) information provided by one or more applications other than the application corresponding to the active session, (3) a time of day, (4) a calendar appointment, and (5) a file size associated with the active session and/or (6) a transfer rate associated with the active session.

Determining mechanism 680 generally determines that a client device is on an active session, where the client device is associated with a first access point of a plurality of access points. Moreover, determining mechanism 680 can also determine a ratio between (a) the remaining duration of the active session and (b) a cost of causing the client device to associate with a second access point different than the first access point.

Association mechanism 690 generally causes the client device to associate with a second access point different than the first access point. In some embodiments, in response to at least to the estimated remaining duration of the active session being greater than a threshold value, association mechanism 690 causes the client device to associate with a second access point different than the first access point. In some embodiments, in response to at least to the estimated remaining duration of the active session being less than the threshold value, association mechanism 690 refrains from causing the client device to associate with the second access point.

In some embodiments, the threshold value is dynamically determined based on: (a) one or more active sessions associated with the client device; (b) one or more characteristics of the client device; and/or (c) a port associated with the active session.

In some embodiments, association mechanism 690 causes or refrains from causing the client device to associate with a second access point further based on a time estimated for the client device to associate with the second access point.

In some embodiments, association mechanism 690 causes or refrains from causing the client device to associate with a second access point further based on (a) a first Mean Opinion Score (MOS) between the client device and the first access point and (b) a second MOS expected between the client device and the second access point.

In some embodiments, association mechanism 690 causes or refrains from causing the client device to associate with a second access point further based on an expected throughput of the client device if the client device associated with the second access point.

In some embodiments, association mechanism 690 causes or refrains from causing the client device to associate with a second access point further based on a latency sensitivity associated with one or more active sessions for the client device.

In some embodiments, association mechanism 690 causes or refrains from causing the client device to associate with a second access point further based on a disruption toleration value associated with one or more active sessions for the client device.

In some embodiments, association mechanism 690 causes or refrains from causing the client device to associate with a second access point further based on (a) a first Signal to Interference and Noise Ratio (SINR) for wireless signals between the client device and the first access point and (b) a second SINR for wireless signals between the client device and the second access point.

In some embodiments, association mechanism 690 causes or refrains from causing the client device to associate with a second access point further based on a port associated with the active session.

In some embodiments, association mechanism 690 refrains from causing the client device to associate with the second access point. Here, a signal strength quality between the client device and the second access point is better than a signal strength quality between the client device and the first access point.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A computer-implemented method comprising:
   estimating, by network device, a remaining duration of an active session between a client device and a first access point in a wireless local area network (WLAN);
   calculating, by the network device, a first session quality measure indicating a first estimated session quality in response to the client device continuing to be associated with the first access point during the remaining duration of the active session;
   calculating, by the network device, a second session quality measure indicating a second estimated session quality in response to the client device associating with a second access point in the WLAN, wherein associating with the second access point corresponds to a cost of disruption in networking service to the client device;
   determining, by the network device a threshold value based on (1) a difference between the first session quality and the second session quality, and (2) the cost of disruption in networking service to the client device;
   responsive to the estimated remaining duration of the active session being greater than the threshold value, redirecting the client device to associate with the second access point in the WLAN during the remaining duration of the active session; and
   responsive to the estimated remaining duration of the active session being less than the threshold value, continuing serving the client device by the first access point during the remaining duration of the active session.

2. The method of claim 1, wherein calculating the first session quality measure further comprises determining a first mean opinion score (MOS) for the first access point in the WLAN; and wherein calculating the second session quality measure further comprises determining a second mean opinion score (MOS) for the second access point in the WLAN.

3. The method of claim 2, wherein the MOS comprises an interference level of the access point; and a total number of client devices associated with the first access point.

4. The method of claim 2, wherein the MOS comprises a strength of a signal received by the second access point from the client device while the client device is connected to the first access point; and a total number of client devices associated with the second access point.

5. The method of claim 1, wherein the threshold value is dynamically determined based on at least one active session associated with the client device.

6. The method of claim 1, wherein the threshold value is dynamically determined based on at least one characteristics of the client device.

7. The method of claim 1, wherein the threshold value is determined based on a port associated with the active session.

8. The method of claim 1, wherein the remaining duration of the active session is estimated based on at least one of historical data associated with the client device and a pattern associated with the client device.

9. The method of claim 1, wherein the remaining duration of the active session is estimated based on information provided by a second application other than a first application corresponding to the active session.

10. The method of claim 1, wherein the remaining duration of the active session is estimated based on a time of day.

11. The method of claim 1, wherein the remaining duration of the active session is estimated based on a calendar appointment configured on the client device.

12. The method of claim 1, wherein the remaining duration of the active session is based on a file size associated with the active session and/or a transfer rate associated with the active session.

13. The method of claim 1, wherein redirecting the client device to associate with the second access point is further responsive to determining that the client device is estimated to take less than a threshold time period to associate with the second access point.

14. The method of claim 1, wherein redirecting the client device to associate with the second access point is further based on an expected throughput of the client device if the client device associated with the second access point.

15. The method of claim 1, wherein redirecting the client device to associate with the second access point is further based on a latency sensitivity associated with the at least one active session for the client device.

16. The method of claim 1, wherein c redirecting the client device to associate with the second access point is further based on a disruption toleration value associated with the at least one active session for the client device.

17. The method of claim 1, wherein redirecting the client device to associate with the second access point is further based on (a) a first Signal to Interference and Noise Ratio (SINR) for wireless signals between the client device and the first access point and (b) a second SINR for wireless signals between the client device and the second access point.

18. The method of claim 1, wherein redirecting the client device to associate with the second access point is further based on a port associated with the active session.

19. A network device comprising:
a memory;
a processor executing instructions stored in the memory to:
estimate a remaining duration of an active session between a client device and a first access point in a wireless local area network (WLAN);
calculate a first session quality measure indicating a first estimated session quality in response to the client device continuing to be associated with the first access point during the remaining duration of the active session;
calculate a second session quality measure indicating a second estimated session quality in response to the client device associating with a second access point in the WLAN, wherein associating with the second access point corresponds to a cost of disruption in networking service to the client device;
determine a threshold value based on (1) a difference between the first session quality and the second session quality, and (2) the cost of disruption in networking service to the client device;
redirect the client device to associate with the second access point in the WLAN during the remaining duration of the active session responsive to the estimated remaining duration of the active session being greater than the threshold value; and
continue serving the client device by the first access point during the remaining duration of the active session responsive to the estimated remaining duration of the active session being less than the threshold value.

20. A non-transitory computer readable medium comprising instructions which, when executed by at least one hardware processor of a network device, causes performance of operations comprising:
estimating a remaining duration of an active session between a client device and a first access point in a wireless local area network (WLAN);
calculating a first session quality measure indicating a first estimated session quality in response to the client device continuing to be associated with the first access point during the remaining duration of the active session;
calculating a second session quality measure indicating a second estimated session quality in response to the client device associating with a second access point in the WLAN, wherein associating with the second access point corresponds to a cost of disruption in networking service to the client device;
determining a threshold value based on (1) a difference between the first session quality and the second session quality, and (2) the cost of disruption in networking service to the client device;
responsive to the estimated remaining duration of the active session being greater than the threshold value, redirecting the client device to associate with the second access point in the WLAN during the remaining duration of the active session; and
responsive to the estimated remaining duration of the active session being less than the threshold value, continuing serving the client device by the first access point during the remaining duration of the active session.

* * * * *